United States Patent
Takahashi et al.

(10) Patent No.: US 12,255,313 B2
(45) Date of Patent: Mar. 18, 2025

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

(71) Applicant: SHIN-ETSU CHEMICAL CO., LTD., Tokyo (JP)

(72) Inventors: Kohta Takahashi, Takasaki (JP); Takakazu Hirose, Annaka (JP); Takumi Matsuno, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 414 days.

(21) Appl. No.: 16/500,193

(22) PCT Filed: May 18, 2018

(86) PCT No.: PCT/JP2018/019212
§ 371 (c)(1),
(2) Date: Oct. 2, 2019

(87) PCT Pub. No.: WO2018/221258
PCT Pub. Date: Dec. 6, 2018

(65) Prior Publication Data
US 2020/0112021 A1    Apr. 9, 2020

(30) Foreign Application Priority Data
Jun. 2, 2017 (JP) ................................ 2017-109785

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/485* (2013.01); *H01M 4/587* (2013.01); *H01M 2004/027* (2013.01)

(58) Field of Classification Search
CPC ...... H01M 4/366; H01M 4/485; H01M 4/587; H01M 2004/027; H01M 4/5825; H01M 4/483; Y02E 60/10
(Continued)

(56) References Cited

U.S. PATENT DOCUMENTS 7,358,011 B2 *  4/2008  Fukuoka ........... H01M 10/0525
                                                              429/232
2003/0134950 A1    7/2003  Kudo et al.
(Continued)

FOREIGN PATENT DOCUMENTS

| CN | 1505187 A | 6/2004 |
|---|---|---|
| CN | 102255082 A | 11/2011 |

(Continued)

OTHER PUBLICATIONS

Aug. 7, 2018 Search Report issued in International Patent Application No. PCT/JP2018/019212.
(Continued)

*Primary Examiner* — Christian Roldan
(74) *Attorney, Agent, or Firm* — Oliff PLC

(57) ABSTRACT

A negative electrode active material for a non-aqueous electrolyte secondary battery containing a negative electrode active material particle which includes a silicon compound particle containing a silicon compound ($SiO_x$: $0.5 \leq x \leq 1.6$). The silicon compound particle contains a Li compound, at least a part of the silicon compound particle is coated with a carbon material, and at least a part of a surface of the
(Continued)

silicon compound particle, a surface of the carbon material, or both of them is coated with a layer containing a compound having a silyl group.

8 Claims, 2 Drawing Sheets

(51) Int. Cl.
  *H01M 4/485* (2010.01)
  *H01M 4/587* (2010.01)
(58) Field of Classification Search
  USPC ........................................................ 429/231
  See application file for complete search history.

(56) References Cited

U.S. PATENT DOCUMENTS

| | | |
|---|---|---|
| 2004/0106040 A1 | 6/2004 | Fukuoka et al. |
| 2006/0083987 A1 | 4/2006 | Konishiike et al. |
| 2006/0099507 A1 | 5/2006 | Kogetsu et al. |
| 2008/0176137 A1 | 7/2008 | Endo et al. |
| 2008/0311472 A1* | 12/2008 | Yamaguchi ....... H01M 10/0569 29/623.5 |
| 2009/0075173 A1 | 3/2009 | Jeong et al. |
| 2010/0015523 A1 | 1/2010 | Ryu et al. |
| 2011/0287313 A1 | 11/2011 | Fukuoka et al. |
| 2012/0316266 A1 | 12/2012 | Koyama et al. |
| 2014/0065493 A1* | 3/2014 | Park ..................... H01M 6/162 429/343 |
| 2014/0315086 A1 | 10/2014 | Put et al. |
| 2015/0188127 A1 | 7/2015 | Niimi et al. |
| 2015/0221950 A1* | 8/2015 | Minami ........... H01M 10/0525 429/223 |
| 2016/0190651 A1* | 6/2016 | Inagaki ................ H01M 4/485 429/7 |
| 2016/0315310 A1 | 10/2016 | Kamo et al. |

FOREIGN PATENT DOCUMENTS

| | | |
|---|---|---|
| CN | 102781821 A | 11/2012 |
| CN | 103999267 A | 8/2014 |
| CN | 106067543 A | 11/2016 |
| JP | 2000-044226 A | 2/2000 |
| JP | 2001-185127 A | 7/2001 |
| JP | 2002-042806 A | 2/2002 |
| JP | 2004-178917 A | 6/2004 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 5160544 B2 | 3/2013 |
| JP | 2014-002956 A | 1/2014 |
| JP | 2016-207446 A | 12/2016 |
| JP | 2017-073302 A | 4/2017 |
| WO | 2014/007027 A1 | 1/2014 |
| WO | 2017/051500 A1 | 3/2017 |

OTHER PUBLICATIONS

Dec. 3, 2019 International Preliminary Report on Patentability in International Patent Application No. PCT/JP2018/019212.

Jun. 16, 2020 Japanese Office Action issued in Japanese Patent Application No. 2017-109785.

Mar. 21, 2022 Office Action issued in Chinese Application No. 201880036598.6.

Sep. 29, 2024 Search Report issued in Chinese Patent Application No. 202211456461.0.

* cited by examiner

[FIG. 1]
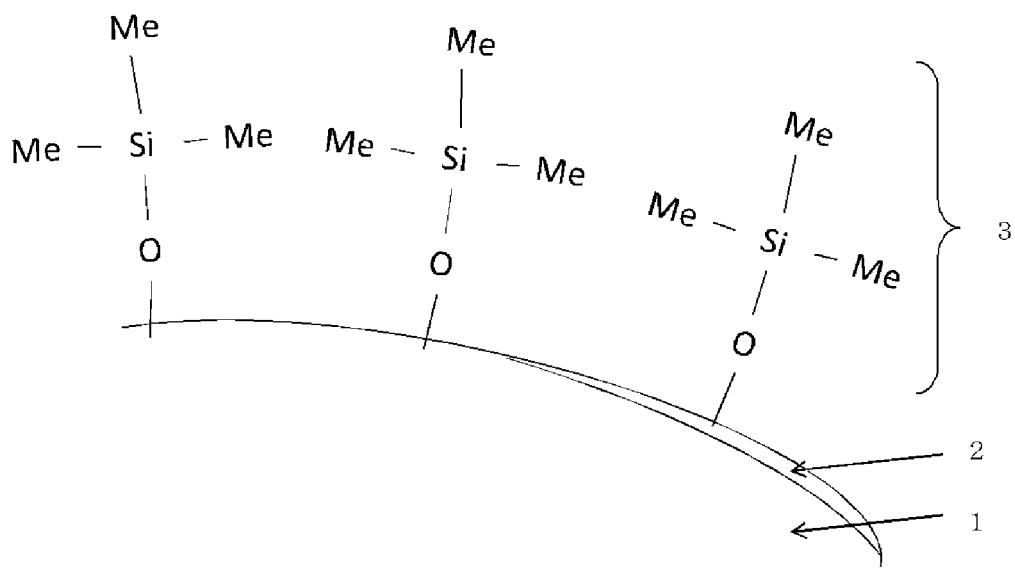
[FIG. 2]
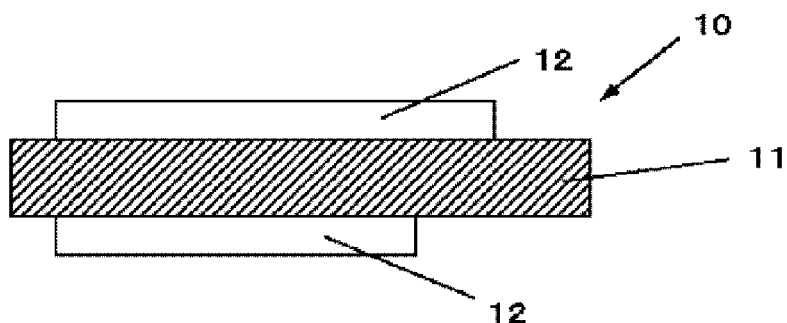
[FIG. 3]
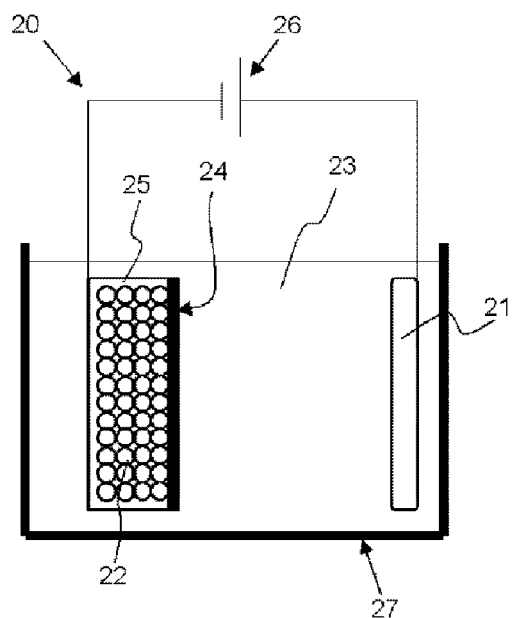

[FIG. 4]
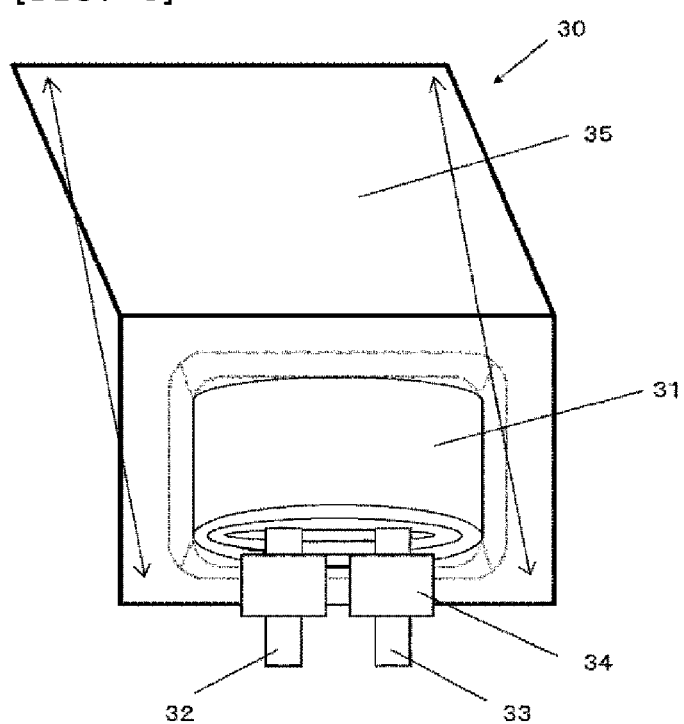

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

TECHNICAL FIELD

The present invention relates to a negative electrode active material for a non-aqueous electrolyte secondary battery, a non-aqueous electrolyte secondary battery, and a method for producing a negative electrode material for a non-aqueous electrolyte secondary battery.

BACKGROUND ART

In recent years, small electronic devices, represented by mobile terminals, have been widely used and urgently required to further reduce the size and weight and to increase the life. Such market requirements have advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon materials ranges from a standard application type to an integrated type in which the materials are directly accumulated on a current collector.

Use of silicon as a main material of a negative electrode active material, however, expands and shrinks the negative electrode active material when charging or discharging, thereby making the negative electrode active material easy to break particularly near its surface layer. In addition, this negative electrode active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials and configurations of a negative electrode for a lithium-ion secondary battery mainly using a silicon material have been considered to improve the initial efficiency and the cycle characteristics of the battery.

Specifically, a vapor deposition method is used to accumulate silicon and amorphous silicon dioxide simultaneously so that better cycle characteristics and greater safety are achieved (see Patent Document 1, for example). Moreover, a carbon material (an electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \leq x \leq 1.5$, the range of particle size=1 μm to 50 μm) and a carbon material are mixed and calcined at a high temperature (see Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example).

Furthermore, as a method for suppressing particle aggregation, an example has been reported in which particle surfaces are treated with a silane compound or the like (for example, Patent Document 9). Moreover, to suppress the amount of water brought into a battery, inorganic particle surfaces are hydrophobized (for example, Patent Document 10). To improve the cycle characteristics, a hydrophobic layer such as a silane compound layer is formed on the surface of a silicon material (see Patent Document 11, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346

Patent Document 9: Japanese Unexamined Patent publication (Kokai) No. 2000-044226 Patent Document 10: Japanese Patent No. 5160544 Patent Document 11: Japanese Unexamined Patent publication (Kokai) No. 2007-234255

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material.

In addition, the lithium ion secondary battery using a silicon material is desired to have battery characteristics almost equivalent to those of a lithium ion secondary battery using a carbon material. Accordingly, batteries have been improved in cycle retention rate and first time efficiency by using a negative electrode active material that is silicon oxide modified by insertion and partial release of Li. However, since the modified silicon oxide is modified using Li, the water resistance is relatively low. This causes insufficient stability of slurry which contains the modified silicon oxide, and which is prepared in producing a negative electrode. Consequently, a gas may be generated as the slurry changes with time, causing a problem that it sometimes becomes impossible or hard to use apparatuses and the like that have been conventionally used for applying carbon-based active materials. There is another problem that the silicon compound particle modified with Li tends to aggregate strongly, making it impossible to apply the slurry. As described above, when the silicon oxide modified with Li to improve the initial efficiency and cycle retention rate is used, the slurry containing water has insufficient stability. Hence, no negative electrode active materials for a non-aqueous electrolyte secondary battery that are superior in industrial production of secondary batteries have been proposed yet.

The present invention has been accomplished in view of the above-described problems. An object of the present invention is to provide a negative electrode active material for a non-aqueous electrolyte secondary battery having high stability in aqueous slurry, high capacity, as well as favorable cycle characteristics and first time efficiency.

Solution to Problem

To achieve the object, the present invention provides a negative electrode active material for a non-aqueous electrolyte secondary battery, containing a negative electrode active material particle;
the negative electrode active material particle comprising
    a silicon compound particle containing a silicon compound ($SiO_x$: $0.5 \leq x \leq 1.6$),
    wherein the silicon compound particle contains a Li compound,
    at least a part of the silicon compound particle is coated with a carbon material, and
    at least a part of a surface of the silicon compound particle, a surface of the carbon material, or both of them is coated with a layer containing a compound having a silyl group.

The inventive negative electrode active material has a compound having a silyl group on the outermost surface of a negative electrode active material particle containing a silicon compound particle. This makes it possible to suppress aggregation of the active materials when an electrode is prepared, and makes the water resistance high in the aqueous slurry. Moreover, in the present invention, at least a part of the surface of the silicon compound particle is coated with a carbon material (hereinafter, also referred to as carbon coating), so that the electric conductivity is excellent. Thus, the use of the inventive negative electrode active material enables industrially advantageous production of a non-aqueous electrolyte secondary battery having high battery capacity and favorable cycle retention rate, which reflect the intrinsic features of the silicon oxide modified with Li. Note that, hereinbelow, the negative electrode active material particle including the silicon compound particle is also referred to as silicon-based active material particle. In addition, the negative electrode active material including this silicon-based active material particle is also referred to as silicon-based active material.

Additionally, the silyl group is preferably a silyl group having an organic group with 1 to 5 carbon atoms.

Such a silyl group can impart adequate hydrophobicity to the negative electrode active material particle.

Preferably, the silicon compound particle at least partially contains at least one or more selected from $Li_4SiO_4$, $Li_2SiO_3$, and $Li_2Si_2O_5$.

Such Li silicates as $Li_4SiO_4$, $Li_2SiO_3$, and $Li_2Si_2O_5$ are relatively stable as the Li compound, so that more favorable battery characteristics are obtained.

Moreover, a coating amount of the carbon material is preferably 0.5 mass % or more and 15 mass % or less relative to a total of the silicon compound particle and the carbon material.

Such a coating amount of the carbon material makes the negative electrode active material particle have high capacity and excellent electric conductivity.

Further, the negative electrode active material particle preferably has a volume resistivity of 0.01 Ω·cm or more and less than 100 Ω·cm which is measured by a four-point probe method in accordance with JIS K 7194 under a load of 38.2 MPa.

The volume resistivity of 0.01 Ω·cm or more and less than 100 Ω·cm can guarantee sufficient electric conductivity, so that more favorable battery characteristics are obtained.

Preferably, the silicon compound particle has a diffraction peak attributable to a Si(111) crystal face obtained from an X-ray diffraction,
    a half value width (2θ) of the diffraction peak is 1.2° or more, and
    a crystallite size corresponding to the crystal face is 7.5 nm or less.

The silicon compound particle having such a crystallite size has low crystallinity, and the content of the Si crystal is low, so that the battery characteristics can be improved.

Furthermore, the silicon compound particle preferably has a median diameter of 0.5 μm or more and 20 μm or less.

When the median diameter is 0.5 μm or more, a side reaction occurs in a smaller area on the surface of the silicon compound particle, so that the battery can keep the cycle retention rate high without excessively consuming Li. Meanwhile, when the median diameter is 20 μm or less, the silicon compound particle expands less during Li insertion and is hard to break and to form a crack. Further, since the expansion of the silicon compound particle is small, for example, a negative electrode active material layer and the like in which a commonly used silicon-based active material is mixed with a carbon active material become hard to break.

Further, the present invention provides a non-aqueous electrolyte secondary battery comprising the inventive negative electrode active material for a non-aqueous electrolyte secondary battery.

Such a secondary battery has high cycle retention rate and first time efficiency, and can be produced industrially advantageously.

Furthermore, the present invention provides a method for producing a negative electrode material for a non-aqueous electrolyte secondary battery containing a negative electrode active material particle including a silicon compound particle, the method comprising the steps of:
preparing a silicon compound particle containing a silicon compound ($SiO_x$: $0.5 \leq x \leq 1.6$);
coating at least a part of the silicon compound particle with a carbon material;
inserting Li into the silicon compound particle to modify the silicon compound particle; and
forming a layer containing a compound having a silyl group on at least a part of a surface of the modified silicon compound particle, a surface of the carbon material, or both of them,
wherein the negative electrode material for a non-aqueous electrolyte secondary battery is produced by using, as the negative electrode active material particle, the silicon compound particle on which the layer containing a compound having a silyl group is formed.

Such a method for producing a negative electrode material for a non-aqueous electrolyte secondary battery can give a non-aqueous negative electrode material having high battery capacity and favorable cycle retention rate, which reflect the intrinsic features of the silicon oxide modified with Li. Further, the negative electrode material thus produced contains the silicon-based active material particle that has a layer containing a compound having a silyl group as described above. Thus, the slurry prepared in producing a negative electrode is stable. That is, it is possible to obtain a negative electrode material that enables industrially advantageously production of secondary batteries.

Advantageous Effects of Invention

The inventive negative electrode active material is capable of improving the stability of a slurry prepared in producing a secondary battery. The use of this slurry makes it possible to form an industrially utilizable coating, thereby substantially improving the battery capacity, cycle characteristics, and first time charge-discharge characteristics. Moreover, the inventive secondary battery containing this negative electrode active material can be produced industrially advantageously, and has favorable battery capacity, cycle characteristics, and first time charge-discharge characteristics. Further, the same effects can be obtained also from an electronic device, a machine tool, an electric vehicle, a power storage systems, and so on which use the inventive secondary battery.

In addition, the inventive method for producing a negative electrode material makes it possible to produce a negative electrode material capable of improving the stability of a slurry prepared in producing a secondary battery, and improving the battery capacity, cycle characteristics, and first time charge-discharge characteristics.

BRIEF DESCRIPTION OF DRAWINGS

FIG. 1 is a schematic diagram showing a configuration in the vicinity of a layer containing a compound having a silyl group on a silicon-based active material particle contained in the inventive negative electrode active material.

FIG. 2 is a sectional view showing a configuration of a negative electrode containing the inventive negative electrode active material.

FIG. 3 is a schematic diagram showing an example of a bulk modification apparatus usable in producing the inventive negative electrode active material.

FIG. 4 is an exploded diagram showing an example of configuration (laminate film type) of a lithium-ion secondary battery containing the inventive negative electrode active material.

DESCRIPTION OF EMBODIMENTS

Hereinafter, embodiments of the present invention will be described, but the present invention is not limited thereto.

As described above, for increasing the battery capacity of lithium ion secondary batteries, it has been investigated a method using a negative electrode mainly made from a silicon-based active material as a negative electrode for a lithium ion secondary battery. Such a lithium ion secondary battery using a silicon-based active material as the main material is desired to have cycle characteristics and initial efficiency almost equivalent to those of a lithium ion secondary battery using a carbon material. However, it has been difficult to prepare a stable slurry and produce a better negative electrode by using a silicon-based active material modified with Li in order to obtain the cycle characteristics and initial efficiency almost equivalent to those of a lithium ion secondary battery using a carbon material.

Accordingly, the present inventors have diligently investigated to obtain a negative electrode active material that can easily produce a non-aqueous electrolyte secondary battery having high battery capacity as well as favorable cycle characteristics and first time efficiency; thereby, providing the present invention.

The inventive negative electrode active material contains a negative electrode active material particle. The negative electrode active material particle includes a silicon compound particle containing a silicon compound ($SiO_x$: $0.5 \leq x \leq 1.6$). The silicon compound particle contains a Li compound. Moreover, at least a part of the silicon compound particle is coated with a carbon material. Further, at least a part of a surface of the silicon compound particle, a surface of the carbon material, or both of them is coated with a layer containing a compound having a silyl group.

Here, FIG. 1 shows a schematic in the vicinity of a surface portion of a silicon compound particle 1. As shown in FIG. 1, a carbon coating 2 is formed on a surface of the silicon compound particle 1. Although the carbon coating is formed on a part of the surface of the silicon compound particle in FIG. 1, the carbon coating may be formed on the entire surface of the silicon compound particle. Additionally, on the surface of the silicon compound particle 1 and a surface of the carbon coating 2, a layer 3 containing a compound having a silyl group (silyl group region) is formed. Although FIG. 1 shows a trimethylsilyl group in the layer 3 containing a compound having a silyl group as an example, the silyl group is not particularly limited thereto.

Since the negative electrode active material like this has such a silyl group as an alkylsilyl group on the outermost surface of the silicon-based active material particle, aggregation of the silicon-based active material particle is suppressed, and the water resistance in an aqueous slurry is high. Conventionally, silicon oxide modified by Li insertion and release is likely to aggregate in an aqueous slurry, and gas is generated due to the over-time change; hence, such silicon oxide is unsuitable for mass production. In contrast, in the present invention, since the silicon-based active material particle has the layer containing a compound having a silyl group as described above, the aggregation in the slurry is suppressed, and the gas generation due to the change of the slurry over time is less likely to occur. Thus, a stable coating can be obtained, and the integrity can be sufficiently guaranteed. Moreover, in the present invention, at least a part of the surface of the silicon compound particle is coated with a carbon coating, so that the electric conductivity is excellent. Therefore, the use of the inventive negative electrode active material enables industrial-scale advantageous production of a non-aqueous electrolyte secondary battery having high battery capacity and favorable cycle retention rate, which reflect the intrinsic features of the silicon oxide modified with Li. The coating amount with the layer containing a compound having a silyl group is not particularly limited, but can be, for example, 10 mass % or less relative to the negative electrode active material particle. Moreover, the lower limit of the coating amount is at least such that the layer containing a compound having a silyl group is formed on the surface of the negative electrode active material particle; for example, the coating amount can be 0.01 mass % or more relative to the negative electrode active material particle.

[Configuration of Negative Electrode]

Next, description will be given of a configuration of a negative electrode of a secondary battery containing the inventive negative electrode active material as described above.

FIG. 2 shows a sectional view of a negative electrode containing the inventive negative electrode active material. As shown in FIG. 2, a negative electrode 10 is constituted to have a negative electrode active material layer 12 on a negative electrode current collector 11. This negative electrode active material layer 12 may be disposed on both sides or only one side of the negative electrode current collector 11. Further, in the inventive negative electrode of a non-aqueous electrolyte secondary battery, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when an active material layer that expands in charging is contained, the current collector containing the above elements has an effect of suppressing deformation of an electrode including the current collector. Each content of the contained elements is not particularly limited, but is preferably 100 ppm or less. This is because a high effect of suppressing deformation is obtained.

The surface of the negative electrode current collector 11 may or may not be roughened. Examples of the roughened negative electrode current collector include a metallic foil subjected to an electrolyzing process, an embossing process, or a chemical etching process, and the like. Examples of the negative electrode current collector that is not roughened include a rolled metallic foil and the like.

[Negative Electrode Active Material Layer]

The negative electrode active material layer 12 may contain multiple types of negative electrode active materials such as a carbon-based active material in addition to the silicon-based active material particle. The negative electrode active material layer 12 may further contain other materials such as a thickener (also referred to as "binding agent", "binder") or a conductive assistant agent depending on battery design. The form of the negative electrode active material may be particle.

As described above, the inventive negative electrode active material contains a silicon compound particle, and the silicon compound particle is a silicon oxide material containing a silicon compound ($SiO_x$: $0.5 \leq x \leq 1.6$). In this composition, "x" is preferably close to 1. This is because high cycle characteristics are obtained. Note that the composition of the silicon oxide material in the present invention does not necessarily mean purity of 100%, and may contain a small quantity of impurity elements.

In the present invention, the silicon compound becomes more favorable as the crystallinity is lower. Specifically, it is desirable that the silicon compound particle has a diffraction peak attributable to a Si(111) crystal face obtained from an X-ray diffraction, a half value width (2θ) of the diffraction peak is 1.2° or more, and a crystallite size corresponding to the crystal face is 7.5 nm or less. A crystallite size may be calculated from a half value width of a diffraction peak attributable to a Si(111) crystal face obtained from an X-ray diffraction. In particular, when the crystallinity and the content of the Si crystal are low as described above, this not only improves the battery characteristics but also can form stable Li compound.

Moreover, the silicon compound particle particularly preferably has a median diameter of 0.5 µm or more and 20 µm or less without particular limitation thereto. This range makes it easy to occlude and release lithium ions in charging and discharging, and the silicon-based active material particle becomes less liable to break. When the median diameter is 0.5 µm or more, the surface area is not so large that a side reaction is hard to occur in charging and discharging, and the irreversible battery capacity can be decreased. Meanwhile, the median diameter is preferably 20 µm or less because the silicon-based active material particle becomes less liable to break, thereby being prevented from forming a new surface.

Further, in the inventive silicon-based active material, at least one or more selected from $Li_4SiO_4$, $Li_2SiO_3$, and $Li_2Si_2O_5$ are preferably present as the Li compound contained in at least a part of the silicon compound particle. Such Li silicates as $Li_4SiO_4$, $Li_2SiO_3$, and $Li_2Si_2O_5$ are more stable than other Li compounds. Accordingly, the silicon-based active material containing the Li compound(s) enables more stable battery characteristics. These Li compounds can be obtained by selectively changing a part of $SiO_2$ component formed in the silicon compound particle to a Li compound to modify the silicon compound particle.

The Li compound in the silicon compound particle can be quantified by NMR (Nuclear Magnetic Resonance) and XPS (X-ray Photoelectron Spectroscopy). The XPS and NMR measurements can be performed, for example, under the following conditions.

XPS
    Apparatus: an X-ray photoelectron spectrometer,
    X-ray Source: a monochromatic Al Kα line,
    X-ray Spot Diameter: 100 µm,
    Ar-ion Gun Sputtering Conditions: 0.5 kV, 2 mm×2 mm.

$^{29}$Si MAS NMR (magic angle spinning-Nuclear Magnetic Resonance)
Apparatus: a 700-NMR spectroscope made by Bruker Corp.,
Probe: a 4-mm HR-MAS rotor, 50 μL,
Sample Rotation Speed: 10 kHz,
Measurement Environment Temperature: 25° C.

Furthermore, in the present invention, when the silicon compound particle is to be modified, it is possible to employ methods such as an electrochemical method, modification by oxidation and/or reduction reactions, and thermal doping, which is a physical method. Particularly, the negative electrode active material is improved in relation to battery characteristics when the silicon compound particle is modified by employing an electrochemical method and modification by oxidation and/or reduction. Moreover, the modification is preferably performed by not only inserting Li into the silicon compound particle but also stabilizing the Li compound by heating and/or releasing Li from the silicon compound particle simultaneously. Thereby, the stability, including the water resistance, of the negative electrode active material in a slurry is further improved.

Additionally, in the inventive negative electrode active material, the silicon compound particle preferably has a peak attributable to a $SiO_2$ region given in a chemical shift value of −95 to −150 ppm obtained from a $^{29}$Si-MAS-NMR spectrum. With such modification that the $SiO_2$ region remains to some extent without changing the entire $SiO_2$ region of the silicon compound particle into a Li compound, the stability in a slurry is further improved.

Moreover, as described above, the silicon-based active material particle has a layer containing a compound having a silyl group on the surface of the silicon compound particle and the surface of the carbon coating.

Examples of the silyl group include silyl groups having an organic group such as an alkyl group. In this case, a silyl group having an organic group with 1 to 5 carbon atoms is preferable. More preferable is a silyl group having an alkyl group with 1 to 5 carbon atoms. In this case, the alkyl group is preferably a methyl group, an ethyl group, a propyl group, an isopropyl group, a butyl group, a tertiary butyl group, and an isobutyl group. When the alkyl chain has 5 carbon atoms or less, the hydrophobicity is not so high that the dispersibility into an aqueous slurry is hardly degraded. Examples of the silyl group having such an alkyl group include trialkylsilyl groups such as a trimethylsilyl group and a triethylsilyl group. In this case, the three alkyls may be identical to or different from one another as mentioned above. Note that the organic group having 1 to 5 carbon atoms may contain an unsaturated bond. Additionally, the alkyl group may contain a fluorine atom.

Coating the surface of the silicon compound particle, and so forth, with the layer containing a compound having a silyl group such as a trialkylsilyl group suppresses the aggregation of the silicon compound particle in preparing an electrode and also improves the water resistance, so that the stability of the slurry is improved.

The silyl group such as an alkylsilyl group on the surface can be identified by TOF-SIMS. Fragments of the compound having a silyl group such as an alkylsilyl compound on the outermost layer can be detected under the following conditions, for example.
PHI TRIFT 2 made by ULVAC-PHI Inc.
Primary Ion Source: Ga
Sample Temperature: 25° C.
Accelerating Voltage: 5 kV
Spot Size: 100 μm×100 μm
Sputter: Ga, 100 μm×100 μm, 10 s
Positive Ion Mass Spectrum
Sample: pressed with indium metal into a powder form Moreover, in the inventive negative electrode active material, a coating amount of the carbon material is preferably 0.5 mass % or more and 15 mass % or less relative to a total of the silicon compound particle and the carbon material. With such a coating amount of the carbon material, the negative electrode active material particle has high capacity and excellent electric conductivity.

Further, in the inventive negative electrode active material, the negative electrode active material particle preferably has a volume resistivity of 0.01 Ω·cm or more and less than 100 Ω·cm which is measured by a four-point probe method in accordance with JIS K 7194 under a load of 38.2 MPa. With the volume resistivity of 0.01 Ω·cm or more and less than 100 Ω·cm, sufficient electric conductivity can be guaranteed, so that more favorable battery characteristics are obtained.

[Method of Producing Negative Electrode]

Subsequently, description will be given of an example of a method for producing the inventive negative electrode of a non-aqueous electrolyte secondary battery.

First, a method for producing a negative electrode material to be contained in the negative electrode will be described. In the beginning, a silicon compound particle containing a silicon compound ($SiO_x$: 0.5≤x≤1.6) is prepared. Next, at least a part of the silicon compound particle is coated with a carbon material. Next, Li is inserted into the silicon compound particle to modify silicon compound particle. In this event, a Li compound can be formed in the interior and on the surface of the silicon compound particle simultaneously. Moreover, in this event, among the inserted Li atoms, some Li atoms may be released from the silicon compound particle. Next, a layer containing a compound having a silyl group is formed on at least a part of a surface of the modified silicon compound particle, a surface of the carbon material, or both of them. Then, such a silicon compound particle on which the layer containing a compound having a silyl group is formed can be used as a negative electrode active material particle to produce the negative electrode material and the negative electrode, for example, through mixing with a conductive assistant agent and a binder.

More specifically, the negative electrode material is produced, for example, by the following procedure.

First, a raw material which generates silicon oxide gas is heated in the presence of inert gas or under reduced pressure in a temperature range of 900° C. to 1600° C. to generate silicon oxide gas. In this case, the raw material is a mixture of metallic silicon powder and silicon dioxide powder. In consideration of the existence of oxygen on the surface of the metallic silicon powder and slight oxygen in a reaction furnace, the mixing mole ratio is desirably in a range of 0.8<metallic silicon powder/silicon dioxide powder <1.3. The Si crystallite in the particle is controlled by changing the arrangement range and the evaporation temperature or a heat treatment after the preparation. The generated gas is deposited on an adsorption plate. Subsequently, the deposit is taken out under the condition of the temperature in the reaction furnace of 100° C. or below, and then the deposit is ground and powdered using a ball mil, a jet mil, or the like.

Next, a carbon coating (carbon material) is formed on a surface layer of the obtained powder material (silicon compound particle). The carbon coating is effective to further improve the battery characteristics of the negative electrode active material.

As a method for forming the carbon coating on the surface layer of the powder material, thermal decomposition CVD is desirable. In the thermal decomposition CVD, the silicon oxide powder is set in a furnace, the furnace is filled with a hydrocarbon gas, and the temperature in the furnace is raised. The pyrolysis temperature is particularly preferably, but not particularly limited to, 1200° C. or less, more preferably 950° C. or less because unintentional disproportionation of the silicon oxide can be suppressed. The hydrocarbon gas is not particularly limited, but preferably has a composition of $C_nH_m$ where 3 n. This is because of low production cost and favorable properties of the decomposition products.

Next, the bulk of the powder material is modified. Examples of the bulk modification method include an electrochemical method, an oxidation-reduction method, and a thermal doping method. The electrochemical method is performed desirably using an apparatus capable of electrochemically inserting and releasing Li. Although the apparatus structure is not particularly limited, the bulk modification can be performed using a bulk modification apparatus 20 shown in FIG. 3, for example. The bulk modification apparatus 20 has: a bath 27 filled with an organic solvent 23; a positive electrode (lithium source, modification source) 21 disposed in the bath 27 and connected to one terminal of a power source 26; a powder storage container 25 disposed in the bath 27 and connected to the other terminal of the power source 26; and a separator 24 provided between the positive electrode 21 and the powder storage container 25. A silicon oxide particle (silicon-based active material particle) 22 is stored in the powder storage container 25. As described above, the powder storage container stores the silicon oxide particle, and the power source applies voltage between the powder storage container storing the silicon oxide particle and the positive electrode (lithium source). Thereby, lithium can be inserted into or released from the silicon compound particle so that the silicon oxide particle 22 can be modified. Heating the resulting silicon oxide particle at 400 to 800° C. can stabilize the Li compound. After the modification, washing may be performed with alcohol, alkaline water, weak acid, pure water, or the like.

As the organic solvent 23 in the bath 27, it is possible to use ethylene carbonate, propylene carbonate, dimethyl carbonate, diethyl carbonate, ethylmethyl carbonate, fluoromethylmethyl carbonate, difluoromethylmethyl carbonate, or the like. Moreover, as an electrolyte salt contained in the organic solvent 23, it is possible to use lithium hexafluorophosphate ($LiPF_6$), lithium tetrafluoroborate ($LiBF_4$), or the like.

As the positive electrode 21, a Li foil or a Li-containing compound may be used. Examples of the Li-containing compound include lithium carbonate, lithium oxide, lithium cobalt oxide, olivine iron lithium, lithium nickel oxide, and lithium vanadium phosphate.

In the modification by the oxidation-reduction method, for example, first, lithium is dissolved in an ether-based solvent to prepare a solution A. The silicon-based active material particle is immersed in the solution A, so that lithium can be inserted. The solution A may further contain a polycyclic aromatic compound or a linear polyphenylene compound. By heating the resulting silicon-based active material particle at 400 to 800° C., the Li compound can be stabilized. Moreover, after the lithium insertion, the silicon-based active material particle may be immersed in a solution B containing a polycyclic aromatic compound or a derivative thereof to release active lithium from the silicon-based active material particle. As a solvent of the solution B, for example, an ether-based solvent, a ketone-based solvent, an ester-based solvent, an alcohol-based solvent, an amine-based solvent, or a mixed solvent thereof can be used. After the modification, washing may be performed with alcohol, alkaline water, weak acid, pure water, or the like.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like. Among these, tetrahydrofuran, dioxane, 1,2-dimethoxy ethane, and diethylene glycol dimethyl ether are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, naphthacene, pentacene, pyrene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, naphthacene, pentacene, pyrene, triphenylene, coronene, chrysene, and derivatives thereof.

Moreover, as the ether-based solvent of the solution B, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, or the like.

As the ketone-based solvent, acetone, acetophenone, and the like may be used.

As the ester-based solvent, methyl formate, methyl acetate, ethyl acetate, propyl acetate, isopropyl acetate, and the like may be used.

As the alcohol-based solvent, methanol, ethanol, propanol, isopropyl alcohol, and the like may be used.

As the amine-based solvent, methyl amine, ethyl amine, ethylene diamine, and the like may be used.

In the modification employing the thermal doping method, the powder material (silicon-based active material particle) can be modified, for example, through mixing with LiH powder or Li powder and heating under a non-oxidative atmosphere. As the non-oxidative atmosphere, for example, Ar atmosphere or the like may be used. More specifically, first, under an Ar atmosphere, the silicon oxide powder is sufficiently mixed with LiH powder or Li powder, and sealed. The whole sealed vessel is stirred to make the mixture uniform. Then, the mixture is heated in a range of 700° C. to 750° C. for the modification. In this case, in order to release Li from the silicon compound particle, it is possible to employ, for example, a method in which the heated powder is sufficiently cooled and then washed with alcohol, alkaline water, weak acid, or pure water.

Subsequently, a layer containing a compound having a silyl group is formed on at least a part of the surface of the modified silicon compound particle, a surface of the carbon material, or both of them. The layer containing a compound having a silyl group is preferably formed by alkylsilazane treatment. In this way, the treatment takes place on the material surface, so that the layer containing a compound having a silyl group can be efficiently formed. More specifically, the layer containing a compound having a silyl group can be formed by the following procedure, for example. It should be noted that OH groups are present on the surfaces of the silicon compound particle and the carbon material. The OH groups react with the alkylsilazane decomposition product, so that the trialkylsilyl group is presumably introduced to the surfaces of the silicon compound particle and the carbon material.

First, dehydrated toluene, the modified silicon compound particle in an amount that is a quarter of the mass of the dehydrated toluene, and HMDS (hexamethyldisilazane) equivalent to 3 mass % of the modified silicon compound particle are introduced into a vessel and stirred for 1 hour. Then, the silicon compound particle on which the layer containing a compound having a silyl group is formed is collected as the negative electrode active material particle by filtration.

Subsequently, the silicon-based active material containing the silicon compound particle having the above-described layer is mixed as necessary with a carbon-based active material. These negative electrode active materials are mixed with other materials such as a binder and a conductive assistant agent to form a negative-electrode mixture. Then, organic solvent, water, or the like is added thereto to form a slurry.

Next, as shown in FIG. 2, the slurry of this negative-electrode mixture is applied onto the surfaces of the negative electrode current collector 11 and dried to form the negative electrode active material layers 12. In this event, heat pressing and so on may be performed as necessary. As described above, the inventive negative electrode of a non-aqueous electrolyte secondary battery is successfully produced.

<Lithium Ion Secondary Battery>

Next, a non-aqueous electrolyte secondary battery of the present invention will be described. The inventive non-aqueous electrolyte secondary battery contains the inventive negative electrode active material. Here, a lithium-ion secondary battery of a laminate film type will be described as a specific example of the inventive non-aqueous electrolyte secondary battery.

[Configuration of Laminate Film Type Secondary Battery]

A laminate film type lithium-ion secondary battery 30 shown in FIG. 4 mainly includes a wound electrode body 31 stored in sheet-shaped outer parts 35. This wound electrode body 31 is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead 32 and the negative-electrode lead 33, for example, extend from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edges of their fusion-bond layers such that each fusion-bond layer faces the wound electrode body 31. The fusion-bond layer is, for example, a film such as a polyethylene or polypropylene film; the metallic layer is aluminum foil or the like; the protecting layer is nylon or the like, for example.

The space between the outer parts 35 and the positive- and negative-electrode leads is filled with close adhesion films 34 to prevent air from entering therein. Exemplary materials of the close adhesion films include polyethylene, polypropylene, and polyolefin resins.

The positive electrode has a positive electrode active material layer disposed on one side or both sides of a positive electrode current collector like the negative electrode 10 shown in FIG. 2, for example.

The positive electrode current collector is made of, for example, a conductive material such as aluminum.

The positive electrode active material layer contains any one kind or two kinds or more of positive electrode materials capable of occluding and releasing lithium ions, and may contain a positive electrode binder, a positive electrode conductive assistant agent, a dispersing agent, or other materials according to design. The same detailed description as described for the negative electrode binders and negative electrode conductive assistant agent, for example, is then given for the positive electrode binder and the positive electrode conductive assistant agent in this case.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and "x" and "y" each represent a value varied depending on a charging or discharging status of a battery, which typically satisfy $0.05 \leq x \leq 1.10$ and $0.05 \leq y \leq 1.10$.

Examples of the complex oxide having lithium and a transition metal element include a lithium-cobalt complex oxide ($Li_xCoO_2$), a lithium-nickel complex oxide ($Li_xNiO_2$), a lithium-nickel-cobalt complex oxide, and the like. Examples of the lithium-nickel-cobalt complex oxide include lithium-nickel-cobalt-aluminum complex oxide (NCA), lithium-nickel-cobalt-manganese complex oxide (NCM), and the like.

Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)), and the like. Higher battery capacity and excellent cycle characteristics are obtained using the positive electrode materials described above.

[Negative Electrode]

The negative electrode has a configuration which is similar to that of the above negative electrode 10 for a lithium-ion secondary battery shown in FIG. 2, and, for example, has the negative electrode active material layers disposed on both faces of the current collector. The negative electrode preferably has a negative-electrode charge capacity larger than electrical capacitance (a battery charge capacity) provided by the positive electrode active material. This negative electrode itself can suppress the precipitation of lithium metal thereon.

The positive electrode active material layer is formed partially on both faces of the positive electrode current collector. Similarly, the negative electrode active material layer is also formed partially on both faces of the negative electrode current collector. In this case, the negative electrode active material layer provided on the negative electrode current collector, for example, has a region which does not correspond to a positive electrode active material layer to be faced. This intends to perform a stabilized battery design.

The area at which the positive and negative electrode active material layers do not face one another is hardly affected by charging and discharging. The status of the negative electrode active material layer is consequently retained since its formation. This enables repeatable investigation of, for example, the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films to give laminate structure. Examples of the synthetic resin include polytetrafluoroethylene, polypropylene, polyethylene, and the like.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

As the solvent, for example, a non-aqueous solvent may be used. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, tetrahydrofuran, and the like. Among these, ethylene carbonate, propylene carbonate, dimethyl carbonate, diethyl carbonate, or ethylmethyl carbonate, or a combination thereof is preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

The solvent preferably contains an unsaturated carbon bond cyclic carbonate ester as an additive, for this enables the formation of a stable coating on a negative electrode at charging and discharging and the inhibition of a decomposition reaction of the electrolytic solution. Examples of the unsaturated carbon bond cyclic carbonate ester include vinylene carbonate, vinyl ethylene carbonate, and the like.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. An example of the acid anhydride includes propane disulfonic acid anhydride.

The electrolyte salt may contain, for example, at least one light metal salt such as lithium salt. Examples of the lithium salt include lithium hexafluorophosphate ($LiPF_6$), lithium tetrafluoroborate ($LiBF_4$), and the like.

The content of the electrolyte salt in the solvent is preferably 0.5 mol/kg or more and 2.5 mol/kg or less. This content enables high ionic conductivity.

[Method of Producing Laminate Film Type Secondary Battery]

Firstly, a positive electrode is produced with the above positive electrode material. A positive-electrode mixture is first created by mixing the positive electrode active material with as necessary the positive electrode binder, the positive electrode conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the compression may be repeated multiple times.

Secondly, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 2).

Then, an electrolytic solution is prepared.

Subsequently, with ultrasonic welding or the like, the positive-electrode lead 32 is attached to the positive electrode current collector and the negative-electrode lead 33 is attached to the negative electrode current collector. Then, the positive and negative electrodes and the separator interposed therebetween are stacked or wound to produce the wound electrode body 31 and a protecting tape is stuck to the outermost circumference of the body. Next, the wound body is flattened. Subsequently, the film-shaped outer part 35 is folded in half to interpose the wound electrode body therebetween. The insulating portions of the outer parts are stuck to one another by heat sealing such that the wound electrode body is encapsulated with one direction being opened. The close-adhesion films are inserted between the outer parts and the positive- and negative-electrode leads. The prepared electrolytic solution is introduced from the opened side in a prescribed amount to perform the impregnation of the electrolytic solution under a vacuum. After the impregnation, the opened side is stuck by vacuum heat sealing. In this manner, the laminate film type secondary battery 30 is successfully produced.

The inventive non-aqueous electrolyte secondary battery such as the laminate film type secondary battery 30 produced as described above preferably has a negative-electrode utilization ratio of 93% or more and 99% or less at charging and discharging. With the negative-electrode utilization ratio in a range of 93% or more, the first time charge efficiency is not lowered, and the battery capacity can be greatly improved. Meanwhile, with the negative-electrode utilization ratio in a range of 99% or less, Li is not precipitated, and the safety can be guaranteed.

EXAMPLE

Hereinafter, the present invention will be more specifically described with reference to Examples of the present invention and Comparative Examples. However, the present invention is not limited to these Examples.

Example 1-1

The laminate film type secondary battery 30 shown in FIG. 4 was produced by the following procedure.

The procedure began with the production of a positive electrode. A positive-electrode mixture was prepared by mixing 95 parts by mass of lithium-nickel-cobalt-aluminum complex oxide ($LiNi_{0.7}Co_{0.25}Al_{0.05}O$) as a positive electrode active material, 2.5 parts by mass of a positive electrode conductive assistant agent (acetylene black), and 2.5 parts by mass of a positive electrode binder (polyvinylidene fluoride: PVDF). Then, the positive-electrode mixture was dispersed in an organic solvent (N-methyl-2-pyrrolidone, NMP) to form a paste slurry. The slurry was subsequently applied to both surfaces of a positive electrode current collector with a coating apparatus having a die head and dried with a drying apparatus of hot-air type. The positive electrode current collector used here had a thickness of 15 μm. The resultant was finally compressed with a roll press.

Next, a negative electrode was produced. In the beginning, a negative electrode active material was produced as follows. A mixed raw material of metallic silicon and silicon dioxide (material to be vaporized) was placed in a reaction furnace and evaporated in an atmosphere with a vacuum degree of 10 Pa to deposit the evaporated material on an adsorption plate. The deposit was sufficiently cooled and then taken out to pulverize the deposit with a ball mill. After the particle size adjustment, the resultant was coated with a carbon coating by thermal CVD. Subsequently, under an argon atmosphere, the silicon compound particles coated with the carbon coating were mixed with LiH powder whose mass was equivalent to 4 mass % of the silicon compound particles, and stirred with a shaker. Thereafter, in an atmosphere-controlled furnace, the stirred powder was heated at 740° C. for the modification. Next, the modified silicon compound particles were introduced into a mixed solution having been obtained by dissolving 3 mass % of HMDS (hexamethyldisilazane) in dehydrated toluene whose amount was twice as large as that of the modified silicon compound particles. After stirring at room temperature for 1 hour, the stirred silicon compound particles were filtrated and dried to remove toluene. Thus, a layer containing a compound having a trimethylsilyl group was formed. As described above, a silicon-based active material was produced.

The silicon-based active material prepared as described above and a carbon-based active material were blended in a mass ratio of 1:9 to prepare a negative electrode active material. The carbon-based active material used here was a mixture in which artificial graphite and natural graphite coated with a pitch layer were mixed in a mass ratio of 5:5. Additionally, the carbon-based active material had a median diameter of 20 μm.

Next, the prepared negative electrode active material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. The resultant was then diluted with pure water to form a negative-electrode mixture slurry. Incidentally, the foregoing SBR and CMC were negative electrode binders (negative electrode binding agents). Here, to measure the stability of the negative-electrode mixture slurry, 30 g of the prepared negative-electrode mixture slurry was taken out separately from the remaining slurry for producing a secondary battery, and stored at 20° C. to observe the gas generation status after the preparation of the negative-electrode mixture slurry.

As a negative electrode current collector, an electrolytic copper foil (thickness: 15 μm) was used. Finally, the negative-electrode mixture slurry was applied onto the negative electrode current collector, and dried at 100° C. for 1 hour in a vacuum atmosphere. The dried negative electrode had a deposited amount of the negative electrode active material layer per unit area at one side (also referred to as an area density) of 5 $mg/cm^2$.

Next, fluoroethylene carbonate (FEC), ethylene carbonate (EC), and diethyl carbonate (DEC) were mixed as solvents, followed by dissolving electrolyte salt (lithium hexafluorophosphate: $LiPF_6$) to prepare an electrolytic solution. In this case, the solvent composition was set to FEC:EC:DEC=1:2:7 in a volume ratio, and the content of the electrolyte salt was set to 1 mol/kg based on the solvents. Further, vinylene carbonate (VC) was added in an amount of 1.5 mass % to the obtained electrolytic solution.

Then, a secondary battery was assembled as follows. First, an aluminum lead was attached to one end of the positive electrode current collector with ultrasonic welding, and a nickel lead was welded to the negative electrode current collector. Subsequently, the positive electrode, a separator, the negative electrode, and a separator were laminated in this order, and wound in the longitudinal direction to produce a wound electrode body. The end of the winding portion was fixed with a PET protecting tape. The separator used herein was a 12-μm laminate film in which a film mainly composed of porous polyethylene was sandwiched by films mainly composed of porous polypropylene. Thereafter, the electrode body was put between outer parts, then peripheries excluding one side were hot melted, and the electrode body was stored in the outer parts. As each outer part, an aluminum laminate film was used in which a nylon film, an aluminum foil, and a polypropylene film were laminated. Then, the prepared electrolytic solution was introduced from the open side to perform the impregnation in a vacuum atmosphere. The open side was then stuck by heat sealing.

The cycle characteristics and first time charge-discharge characteristics of the secondary battery produced as described above were evaluated.

The cycle characteristics were investigated in the following manner. First, two cycles of charging and discharging were performed at 0.2 C under an atmosphere of 25° C. to stabilize the battery, and the discharge capacity in the second cycle was measured. Next, the cycle of charging and discharging was repeated until the total number of cycles reached 299 cycles while the discharge capacity was measured every cycle. Finally, a capacity retention rate (hereinafter, also simply referred to as retention rate) was calculated by dividing the discharge capacity in the 300-th cycle, which was obtained by charging and discharging at 0.2 C, by the discharge capacity in the second cycle. In the normal cycle, that is, in the cycles from the third cycle to 299-th cycle, the charging and discharging were performed at 0.7 C in charging and 0.5 C in discharging.

In investigating the first time charge-discharge characteristics, the first time efficiency was calculated. In this case, a 2032 type coin cell was assembled as the test cell.

The negative electrode used was prepared by the same procedure for the above-described electrode containing the silicon-based active material of the laminate film type secondary battery. The electrolytic solution used was prepared by the same procedure as the above-described electrolytic solution of the laminate film type secondary battery. As the counter electrode, a metal lithium foil having a thickness of 0.5 mm was used. Moreover, as the separator, polyethylene having a thickness of 20 μm was used. Then, a bottom lid of the 2032 type coin cell, the lithium foil, and the separator were stacked on one another, and 150 mL of the electrolytic solution was poured thereto. Subsequently, the negative electrode and a spacer (thickness: 1.0 mm) were stacked, and 150 mL of the electrolytic solution was poured. Thereafter, a spring and a top lid of the coin cell were assembled thereon in this order and crimped with an automatic coin cell crimper to prepare a 2032 type coin cell.

Subsequently, the prepared 2032 type coin cell was charged with a constant current density of 0.2 mA/cm$^2$ until the voltage reached 0.0 V. When the voltage reached 0.0 V, the 2032 type coin cell was charged at a constant voltage of 0.0 V until the current density reached 0.02 mA/cm$^2$. In discharging, the 2032 type coin cell was discharged with a constant current density of 0.2 mA/cm$^2$ until the voltage reached 1.2 V. Then, the first time efficiency was calculated from the equation shown by: first time efficiency (%)=(first time discharge capacity/first time charge capacity)×100. The atmospheric temperature was the same as that in investigating the cycle characteristics.

Moreover, the prepared sample (silicon-based active material) was subjected to TOF-SIMS analysis. The intensity of the TMS (trimethylsilyl) component was measured relative to the intensity of the $C_3H_5$ component.

Comparative Example 1-1

The evaluation of the cycle characteristics of a secondary battery and the other evaluations were performed by the same procedures as in Example 1-1 except that the carbon coating and the layer containing a compound having a silyl group were not formed.

Comparative Example 1-2

The evaluation of the cycle characteristics of a secondary battery and the other evaluations were performed by the same procedures as in Example 1-1 except that the layer containing a compound having a silyl group was not formed.

TABLE 1

SiOx: x = 1, $D_{50}$ = 5 μm, graphite (natural graphite:artificial graphite = 5:5)
$D_{50}$ = 20 μm SiOx ratio: 10 mass %, half value width: 1.85°, crystallite size: 4.6 nm, $Li_2Si_2O_5$,
$Li_2SiO_3$ modification method: thermal doping method, volume resistivity: 0.3 Ω · cm

| | TMS/ $C_3H_5$ | Presence or absence of aggregate | Time until gas generation, day | 10 mass % 1.2 V first time efficiency | Capacity retention rate in 300th cycle | Coating amount of carbon material mass % | Silyl group | Type of alkyl groups X1 | X2 | X3 |
|---|---|---|---|---|---|---|---|---|---|---|
| Comparative Example 1-1 | 0 | present | 0.3 | 76.4% | 68% | 0 | absent | — | — | — |
| Comparative Example 1-2 | 0 | present | 0.5 | 82.1% | 74% | 5 | absent | — | — | — |
| Example 1-1 | 0.105 | absent | 2.0 | 88.6% | 82% | 5 | present | methyl | methyl | methyl |

In Table 1, X1 to X3 show the type of three alkyl groups in the trialkylsilyl group.

As shown in Table 1, when the surface treatment with HMDS was not performed (Comparative Examples 1-1, 1-2), the intensity of the TMS component relative to the intensity of the $C_3H_5$ component was 0, and no TMS group was present on the surface. In contrast, in Example 1-1 in which the HMDS treatment was performed, the intensity of the TMS component relative to the intensity of the $C_3H_5$ component was observed. This verified that the TMS group was present on the surface.

In addition, using these powders, the gas generation and the battery characteristics were checked. As shown in Table 1, when a trimethylsilyl group was present, no aggregate was formed. Moreover, the effect of suppressing the gas generation from the slurry was also observed because of the hydrophobization by the surface coating with the silyl group. As a result, both the first time efficiency and the cycle retention rate were improved. With no silyl group, the time until gas was generated from the slurry was short, and an aggregate was formed, too. As a result, both the first time efficiency and the cycle retention rate were unfavorable.

Examples 2-1 to 2-4

The evaluation of the cycle characteristics of secondary batteries and the other evaluations were performed by the same procedures as in Example 1-1 except that the Li silicate type was changed by changing the Li doping amount.

was obtained even after the cycles. If the coating amount of carbon is more than 15 mass %, the capacity merit of SiO is decreased, which is not practical. Meanwhile, the coating amount of carbon is desirably 0.5 mass % or more; otherwise, the electric conductivity would be degraded.

TABLE 2

SiOx: x = 1, $D_{50}$ = 5 μm, graphite (natural graphite:artificial graphite = 5:5) $D_{50}$ = 20 μm SiOx ratio: 10 mass %, half value width: 1.85°, crystallite size: 4.6 nm, coating amount of carbon material: 5 mass %, trimethylsilyl group: contained modification method: thermal doping method, volume resistivity: 0.3 Ω · cm

|  | Presence or absence of aggregate | Time until gas generation, day | 10 mass % 1.2 V first time efficiency | Capacity retention rate in 300th cycle | Silicate |
|---|---|---|---|---|---|
| Example 1-1 | absent | 2.0 | 88.6% | 82% | $Li_2SiO_3$, $Li_2Si_2O_5$ |
| Example 2-1 | absent | 2.0 | 88.9% | 80% | $Li_4SiO_4$, $Li_2SiO_3$, $Li_2Si_2O_5$ |
| Example 2-2 | absent | 3.0 | 88.4% | 83% | $Li_2Si_2O_5$ |
| Example 2-3 | absent | 2.0 | 89.2% | 81% | $Li_4SiO_4$, $Li_2SiO_3$ |
| Example 2-4 | absent | 2.0 | 89.0% | 82% | $Li_4SiO_4$, $Li_2Si_2O_5$ |

As shown in Table 2, no aggregate was observed from any of the Li silicates, and the obtained results of the gas generation were also favorable. Moreover, when the Li compound was contained, the obtained results of both the first time efficiency and capacity retention rate were favorable.

Examples 3-1 to 3-5

The evaluation of the cycle characteristics of secondary batteries and the other evaluations were performed by the same procedures as in Example 1-1 except for changing the coating amount of the carbon material (carbon coating layer).

Examples 4-1, 4-2

The evaluation of the cycle characteristics of secondary batteries and the other evaluations were performed by the same procedures as in Example 1-1 except that the modification method was changed to an oxidation-reduction method and the crystallite size of the silicon compound particles was also changed.

In Examples 4-1, 4-2, when the silicon compound particles coated with the carbon coating were to be modified by inserting lithium according to the oxidation-reduction method, first, the silicon compound particles coated with the carbon coating were immersed in a solution (the solution A) in which a lithium piece and an aromatic compound, naph-

TABLE 3

SiOx: x = 1, $D_{50}$ = 5 μm, graphite (natural graphite:artificial graphite = 5:5) $D_{50}$ = 20 μm SiOx ratio: 10 mass %, half value width: 1.85°, crystallite size: 4.6 nm $Li_2Si_2O_5$, $Li_2SiO_3$, trimethylsilyl group: contained, modification method: thermal doping method

|  | Presence or absence of aggregate | Time until gas generation, day | 10 mass % 1.2 V first time efficiency | Capacity retention rate in 300th cycle | Coating amount of carbon material, mass % |
|---|---|---|---|---|---|
| Example 1-1 | absent | 2.0 | 88.6% | 82% | 5 |
| Example 3-1 | absent | 3.0 | 89.6% | 83% | 15 |
| Example 3-2 | absent | 3.0 | 89.2% | 83% | 10 |
| Example 3-3 | absent | 2.0 | 88.3% | 82% | 2 |
| Example 3-4 | absent | 2.0 | 87.6% | 81% | 1 |
| Example 3-5 | absent | 2.0 | 86.4% | 81% | 0.5 |

As shown in Table 3, when the coating amount of carbon is larger, the electric conductivity is more favorable, so that the discharging is surely performed, and the first time efficiency is improved. Consequently, high retention rate thalene, were dissolved in tetrahydrofuran (hereinafter, referred to as THF). This solution A had been prepared by dissolving naphthalene in a THF solvent at a concentration of 0.2 mol/L, and then adding a lithium piece whose mass was 10 mass % of the mixture solution of THF and naphthalene. When the silicon compound particles coated with the carbon coating were immersed, the temperature of the solution was 20° C., and the immersion time was 20 hours. Then, the modified silicon compound particles were collected by filtration. By the treatment described above, lithium was inserted into the silicon compound particles.

Subsequently, the obtained silicon compound particles were heated under an argon atmosphere at 600° C. for 24 hours. Thus, the Li compound was stabilized.

Next, the stabilized silicon compound particles were washed. The washed silicon compound particles were dried under reduced pressure. Next, the dried silicon compound particles were introduced into a mixed solution having been obtained by dissolving 3 mass % of HMDS in dehydrated toluene whose amount was twice as large as that of the modified silicon compound particles. After stirring at room temperature for 1 hour, the stirred silicon compound particles were filtrated and dried to remove toluene. Thus, a layer containing a compound having a trimethylsilyl group was formed. As described above, a silicon-based active material was produced.

TABLE 4

SiOx: x = 1, $D_{50}$ = 5 μm, graphite (natural graphite:artificial graphite
= 5:5) $D_{50}$ = 20 μm SiOx ratio: 10 mass %, $Li_2Si_2O_5$, $Li_2SiO_3$, trimethylsilyl group: contained

|   | Presence or absence of aggregate | Time until gas generation, day | 10 mass % 1.2 V first time efficiency | Capacity retention rate in 300th cycle | Doping method | Half value width, 2θ | Crystallite size, nm |
|---|---|---|---|---|---|---|---|
| Example 1-1 | absent | 2.0 | 88.6% | 82% | thermal doping | 1.85 | 4.6 |
| Example 4-1 | absent | 2.0 | 88.6% | 85% | oxidation-reduction | 20.22 | — |
| Example 4-2 | absent | 2.0 | 90.8% | 80% | oxidation-reduction | 1.22 | 7.5 |

As shown in Table 4, decreasing the crystallite size greatly improved the cycle retention rate. This is presumably because as the crystallite size is decreased, the expansion and shrinkage of silicon are moderated. In addition, even when the doping method was changed to the oxidation-reduction doping, the presence of the trimethylsilyl group successfully suppressed the aggregation, and the days until the gas generation was also successfully delayed.

Examples 5-1 to 5-5

The evaluation of the cycle characteristics of secondary batteries and the other evaluations were performed by the same procedures as in Example 1-1 except for changing the modification method and the particle diameter ($D_{50}$) of the silicon compound particles.

TABLE 5

SiOx: x = 1, graphite (natural graphite:artificial graphite =
5:5) $D_{50}$ = 20 μm SiOx ratio: 10 mass %, half value width: 1.85°, crystallite size: 4.6 nm
$Li_2Si_2O_5$, $Li_2SiO_3$, trimethylsilyl group: contained, modification method:
oxidation-reduction method

|   | Presence or absence of aggregate | Time until gas generation, day | 10 mass % 1.2 V first time efficiency | Capacity retention rate in 300th cycle | Particle diameter $D_{50}$, μm |
|---|---|---|---|---|---|
| Example 5-1 | absent | 2.0 | 90.1% | 80% | 5 |
| Example 5-2 | absent | 1.5 | 88.1% | 76% | 2 |
| Example 5-3 | absent | 3.0 | 90.3% | 84% | 10 |
| Example 5-4 | absent | 3.5 | 90.5% | 84% | 15 |
| Example 5-5 | absent | 4.0 | 88.4% | 79% | 18 |

If the particle diameter of the silicon compound particles containing SiO is too small, the surface area is increased too largely. Thus, to extend the days until gas generation, the particle diameter is more preferably 2 μm or more. Since increasing the particle diameter decreases the surface area, the days until gas is generated can be delayed. Additionally, a side reaction in the battery is also suppressed, so that both the first time efficiency and the cycle retention rate are improved. On the other hand, if the particle diameter is too large, SiO expands and shrinks greatly in charging and discharging, possibly causing bulk fracturing. Thus, the particle diameter is desirably 20 μm or less.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A negative electrode active material for a non-aqueous electrolyte secondary battery, the negative electrode active material containing
   a negative electrode active material particle comprising a silicon compound particle containing a silicon compound ($SiO_x$: $0.5 \leq x \leq 1.6$),
   wherein
   the silicon compound particle contains a Li compound,
   at least a part of the silicon compound particle is coated with a carbon material,
   the silicon compound particle at least partially contains at least one or more selected from $Li_4SiO_4$, $Li_2SiO_3$, and $Li_2Si_2O_5$,
   a compound having a trialkylsilyl group is present on an outermost surface of the negative electrode active material particle such that at least a part of a surface of the silicon compound particle, a surface of the carbon material, or both of them are coated with a layer containing the compound having the trialkylsilyl group,
   the trialkylsilyl group has alkyl groups with 1 to 5 carbon atoms, and
   a coating amount of the carbon material is 0.5 mass % or more and 15 mass % or less relative to a total of the silicon compound particle and the carbon material.

2. The negative electrode active material for a non-aqueous electrolyte secondary battery according to claim 1, wherein the negative electrode active material particle has a volume resistivity of 0.01 Ω·cm or more and less than 100 Ω·cm which is measured by a four-point probe method in accordance with JIS K 7194 under a load of 38.2 MPa.

3. The negative electrode active material for a non-aqueous electrolyte secondary battery according to claim 1, wherein
   the silicon compound particle has a diffraction peak attributable to a Si(111) crystal face obtained from an X-ray diffraction,
   a half value width (2θ) of the diffraction peak is 1.2° or more, and
   a crystallite size corresponding to the crystal face is 7.5 nm or less.

4. The negative electrode active material for a non-aqueous electrolyte secondary battery according to claim 1, wherein the silicon compound particle has a median diameter of 0.5 μm or more and 20 μm or less.

5. A non-aqueous electrolyte secondary battery comprising the negative electrode active material for a non-aqueous electrolyte secondary battery according to claim 1.

6. The negative electrode active material for a non-aqueous electrolyte secondary battery according to claim 1, wherein the trialkysilyl group is trimethylsilyl.

7. The negative electrode active material for a non-aqueous electrolyte secondary battery according to claim 1, wherein the surface of the carbon material is coated with the layer containing the compound having the trialkylsilyl group.

8. A method for producing a negative electrode material for a non-aqueous electrolyte secondary battery according to claim 1, the method comprising the steps of:
   preparing a silicon compound particle containing a silicon compound ($SiO_x$: $0.5 \leq x \leq 1.6$);
   coating at least a part of the silicon compound particle with the carbon material;
   inserting Li into the silicon compound particle to form the Li compound;
   forming a layer containing the compound having a trialkylsilyl group on at least a part of a surface of the silicon compound particle, the surface of the carbon material, or both of them, and
   utilizing the silicon compound particle on which the layer containing the compound having the trialkylsilyl group is formed as the negative electrode active material particle to produce the negative electrode material for a non-aqueous electrolyte secondary battery.

* * * * *